US005571271A

United States Patent [19]

Kobari et al.

[11] Patent Number: 5,571,271
[45] Date of Patent: * Nov. 5, 1996

[54] AIR BAG INFLATION GAS GENERATOR

[75] Inventors: Hirokazu Kobari; Junichi Kishimoto; Takashi Minamizawa; Yukio Ikeda, all of Fukushima-ken; Kanichi Fukuda; Haruki Abe, both of Tokyo, all of Japan

[73] Assignees: Nippon Koki Co., Ltd.; Honda Giken Kogyo Kabushiki Kaisha, both of Tokyo, Japan

[*] Notice: The term of this patent shall not extend beyond the expiration date of Pat. No. 5,350,193.

[21] Appl. No.: 532,005

[22] Filed: Sep. 21, 1995

Related U.S. Application Data

[63] Continuation of Ser. No. 83,889, Jun. 28, 1993, abandoned.

[30] Foreign Application Priority Data

Aug. 28, 1992 [JP] Japan ..................................... 4-230085
Oct. 9, 1992 [JP] Japan ..................................... 4-272003

[51] Int. Cl.$^6$ ..................................... B60R 21/28
[52] U.S. Cl. ..................... 280/741; 29/511; 29/513; 280/728.1
[58] Field of Search ..................... 280/728.2, 741, 280/728.1, 740, 732; 102/530, 531; 29/513, 511; 403/274, 279

[56] References Cited

U.S. PATENT DOCUMENTS 3,858,914  1/1975  Karie et al. ................. 29/511
3,985,076  10/1976 Scheiter et al. .............. 280/741
4,296,084  10/1981 Adams et al. ................ 423/351
4,370,930  2/1983  Strasser et al. .............. 102/530
4,806,180  2/1989  Goetz et al. ................. 280/741
4,878,690  11/1989 Cunningham .................. 280/741
5,005,486  4/1991  Lenzen ....................... 102/531
5,087,070  2/1992  O'Loughlin et al. ............ 280/740
5,345,875  9/1994  Anderson .................... 102/530
5,350,193  9/1994  Murashima et al. ............. 280/741
5,382,415  1/1995  Kishimoto et al. ............. 280/741

FOREIGN PATENT DOCUMENTS 2-155857  6/1990  Japan .
5-138005  6/1993  Japan .

*Primary Examiner*—Eric D. Culbreth
*Attorney, Agent, or Firm*—Kalish & Gilster

[57] ABSTRACT

This invention relates to an air bag inflation gas generator and aims to surely retain the space between an igniter and an ignition agent of a gas generating agent pack and to surely caulk an end cap. This invention has a longitudinal cylindrical member having its both ends sealed by one end plate and the other end plate and a plurality of gas outlets formed in its outer periphery, a gas generating agent pack which is accommodated in the cylindrical member, accommodates a plurality of gas generating agents in the compiled state in the axial direction of a longitudinal cylindrical pack whose both ends are sealed with one end face and the other end face and has an ignition agent disposed close to the one end face, an igniter disposed at the one end plate of the cylindrical member, and an energizing member which is disposed between the other end plate of the cylindrical member and the other end face of the gas generating agent pack and energizes the gas generating agent pack toward the igniter side.

3 Claims, 9 Drawing Sheets

AIR BAG INFLATION GAS GENERATOR

This application is a continuation of application Ser. No. 08/083,889, filed Jun. 28, 1993, now abandoned.

BACKGROUND OF THE INVENTION

1. Field of the Invention

This invention relates to an air bag inflation gas generator to feed combustion gas for inflation of air bags such as air bags for absorbing collision shocks, life jackets, rafts, and escape chutes.

2. Description of the Known Art

A shock absorber to protect a passenger car driver from shocks at collision accidents comprises an air bag, for example, having a capacity of 60 liters and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas for driver protection against any collision shocks, thereby avoiding possible serious injury of the driver.

FIG. 11 shows a prior air bag inflation gas generator disclosed in Japanese Patent Application Laid-open Print No. 155857/1990. In the drawing, the reference numeral 1 shows a combustion chamber containing a plurality of gas generating agents 2 in the stacked state.

The gas generating agents 2 are a circular plate having a through hole 3 at the center, and the through hole 3 accommodates an ignition agent 4.

These gas generating agents 2 are accommodated in a concealed container 5. At the center of this concealed container 5, a concave part 6 is formed to be depressed toward the through hole 3 of the gas generating agents 2.

In the concave part 6 is provided an igniter 7 to burn the gas generating agents 2.

The combustion chamber 1 has a combustion chamber filter 8 disposed along its inner wall. And, a plenum chamber 10 annually surrounds the combustion chamber 1 and receives gas flow through an orifice 9 from the combustion chamber filter 8.

The plenum chamber 10 contains a plenum chamber filter consisting of an upper filter 11 and a gas filter 12.

The plenum chamber 10 contains a gas outlet 13 to supply the gas flow from the gas filter 12 to an air bag (not shown).

In this type of air bag inflation gas generator, the powder in the igniter 7 burns when the igniter 7 is energized. The igniter 7 in turn causes the ignition agent 4 to burn and the gas generating agents 2 are burned. Gas from the gas generating agents 2 flows into the plenum chamber 10 through a combustion chamber filter 5 arranged along the inner wall of the combustion chamber 1. The gas is purified by the upper filter 11 and the gas filter 12 and flows into the air bag through the gas outlet 13. The air bag can be completely inflated within a very short time, for example, approximately 0.04 second.

That air bag inflation gas generator, however, has drawbacks that the combustion gas capacity of the gas generating agents 2 is limited and the purifying performance of the combustion gas is also limited.

Specifically, when the air bag for a front passenger is inflated, because the front passenger seat has a different riding environment from the driver seat and a passenger takes various positions, and when a child takes the front passenger seat, physical features are different from an adult, requiring, for example, an air bag to have a large capacity of about 2.5 times of a conventional air bag for the driver seat. Therefore, it has been demanded that the combustion gas capacity of the gas generating agents is large and the gas generator for air bag inflation can purify the large volume of combustion gas surely.

The present inventor has developed a gas generator for inflating an air bag which has remedied the conventional problems and filed Japanese Patent Application No. 299116/1991 (filing date: Nov. 14, 1991).

This air bag inflation gas generator, as shown in FIG. 12, has a longitudinal outer cylindrical member 14 having a plurality of gas outlets 15 formed at the outer periphery, an inner cylindrical member 16 which is inserted in the outer cylindrical member 14 and has gas flow holes 17 formed at the outer periphery, a final filter 18 disposed between the outer cylindrical member 14 and the inner cylindrical member 16, a plurality of gas generating agents 20 accommodated in the inner cylindrical member 16 in the stacked state in its longitudinal direction and having a through hole 19 formed at the center, and an igniter 21 and an ignition agent 22 disposed at one end of the inner cylindrical member 16. And, a partition member 23 for shielding the through holes 19 of the gas generating agents 20 is disposed between the gas generating agents 20 positioned at the center of the inner cylindrical member 16.

And, the gas generating agents 20 and the ignition agent 22 are accommodated in a gas generating agent pack 24.

With this air bag inflation gas generator, the combustion gas capacity of the gas generating agents 20 can be largely increased over those previously known, and a large volume of combustion gas can be surely purified.

With the partition member 23, the volume of the combustion gas flowing into the air bag at the initial inflation of the air bag can be easily and surely controlled. And, at the initial inflation of the air bag, rapid flow of combustion gas into the air bag can be effectively prevented. Thus, impact against a passenger can be effectively eased.

However, such an air bag inflation gas generator merely accommodates the gas generating agent pack 24 in the inner cylindrical member 16, so that the space between the ignition agent 22 and the igniter 21 in the gas generating agent pack may not be securely retained, and particularly, when the space between the igniter 21 and the ignition agent 22 is widened, the ignition performance may possibly be lowered.

And, in such an air bag inflation gas generator, after disposing an end cap 26 within an opening 25 of the outer cylindrical member 14, a wall face 27 of the opening 25 is caulked using the inner cylindrical member 16 as a support for the end cap 26 to mount the end cap 26 on the opening 25. This procedure may apply an unreasonable load to the inner cylindrical member 16.

Further, since a caulking face 28 of the end cap 26 is flat, wall 27 of the opening 25 has to be bent at an angle of about 90 degrees. This may result in causing cracks in the opening 25.

SUMMARY OF THE INVENTION

A primary object of this invention is to provide an air bag inflation gas generator which can securely retain a space between an ignition agent and an igniter in a gas generating agent pack.

A second object of this invention is to provide an air bag inflation gas generator in which an end cap can be securely caulked.

A first embodiment of this invention comprises a longitudinal cylindrical member having its both ends sealed with one side end plate and the other side end plate and having a plurality of gas outlets in its outer periphery, a gas generating agent pack which is accommodated in the cylindrical member, has a plurality of gas generating agents accommodated in the compiled state in the axial direction of a longitudinal cylindrical pack whose both ends being sealed with one end face and the other end face and an ignition agent being disposed close to the above one end face, an igniter disposed at the one end face of the cylindrical member, and an energizing member which is disposed between the other end plate of the cylindrical member and the other end face of the gas generating agent pack and to energize the gas generating agent pack toward the igniter side.

In the first embodiment of this invention, the energizing member disposed between the other end plate of the cylindrical member and the other end face of the gas generating agent pack energizes the gas generating agent pack toward the igniter side and retains the space between the ignition agent and the igniter of the gas generating agent pack.

In the first embodiment of this invention, a cap and an opening end of a cylindrical pack are fasten-folded double, to form a double crimp seal so that the fasten-folded section does not open even if the energizing force of the energizing member acts on the cap.

On the other hand, a second embodiment of this invention is an air bag inflation gas generator comprising a longitudinal cylindrical bottom-closed member having an opening at one end and a plurality of gas outlets formed in the outer periphery, a circular end cap disposed in the opening of the cylindrical member and caulked by the wall face of the opening, a gas generating agent pack accommodated in the cylindrical member, and an igniter disposed in the end cap. The opening of the cylindrical member has an end cap placing step section having an approximately L-shaped cross section formed toward the outer wall face of the cylindrical member from the inner wall face of the cylindrical member and a taper section having a diameter increased toward the opening end ranging to the end cap placing step section. And, the end cap has a wall face vertically rising from the edge part of the bottom and a caulking face circularly formed from the periphery of the wall face toward the center.

In the second embodiment of this invention, after disposing the end cap at the end cap placing step section of the cylindrical member, the taper section of the opening is caulked toward the circularly formed caulking face of the end cap, so that the wall thickness of the taper section can be caulked evenly.

According to the second embodiment of the invention, after the end cap is placed on the step section for placing the end cap at the opening of the cylindrical member, the taper section having a diameter increased toward the opening end ranging to the step section for placing the end cap is caulked toward the caulking face of the end cap, so that the wall face of the end cap vertically rising is caulked in the state restrained by the straight section of the step for placing the end cap, and the taper section of the opening is securely caulked along the caulking face of the end cap.

DESCRIPTION OF THE PREFERRED EMBODIMENT OF THE INVENTION

Now, details of this invention will be described with reference to the attached drawings.

Figure 1:
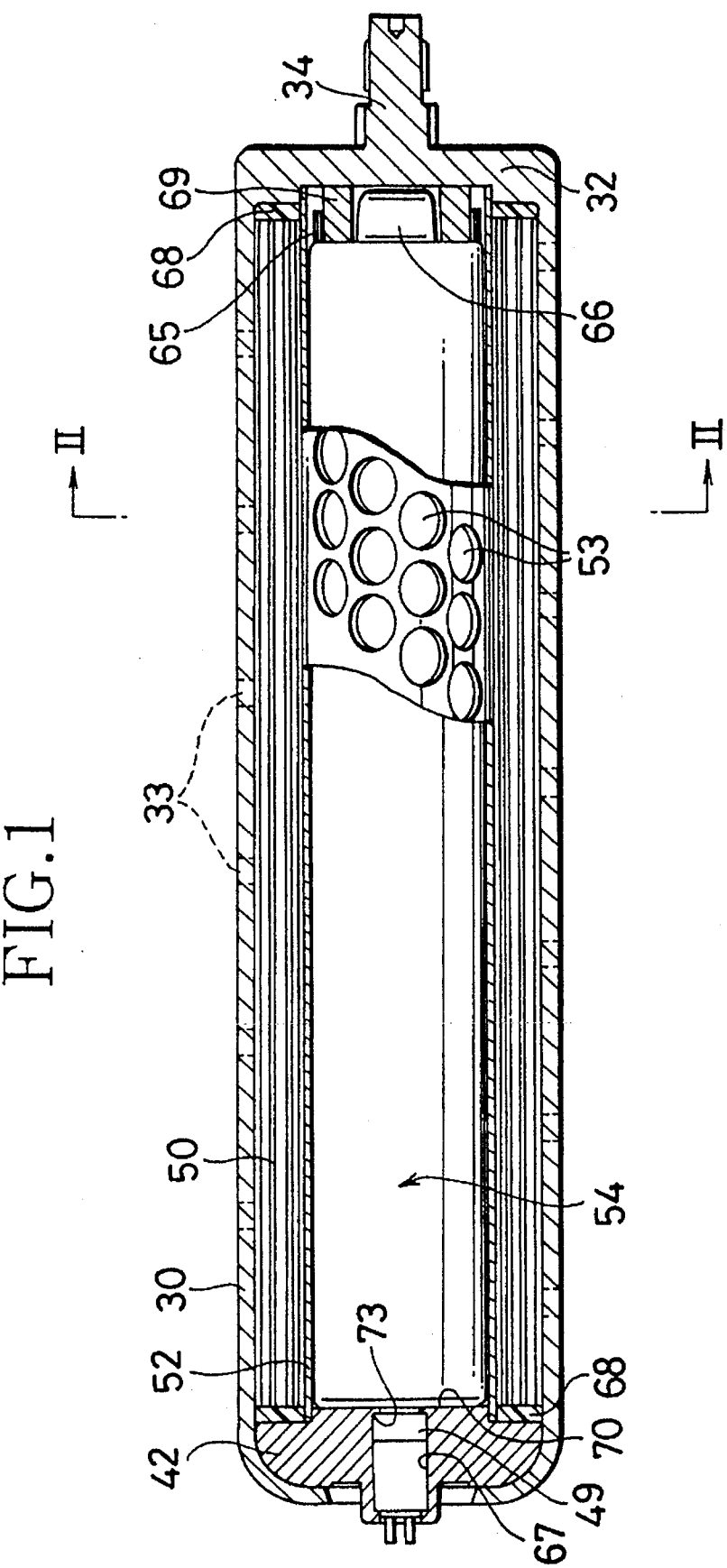
FIG. 1 is a vertical section showing one embodiment of an air bag inflation gas generator of this invention.
Figure 2:
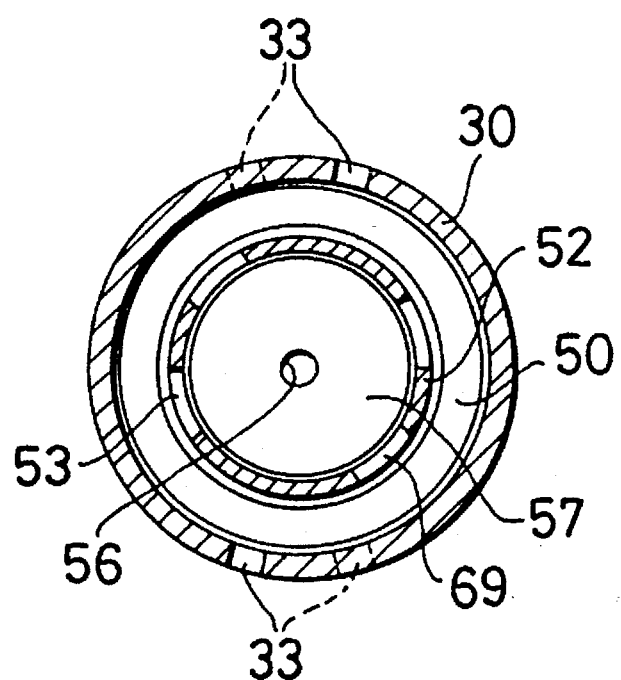
FIG. 2 is a transverse cross section taken on line II—II of FIG. 1.

FIG. 1 and FIG. 2 show one embodiment of an air bag inflation gas generator of this invention, and in the drawings, the reference numeral 30 indicates a longitudinal outer cylindrical member sealed by an end cap 42 and an end 32.

The outer cylindrical member 30 is made of JIS 5000 series aluminum material.

Figure 6:
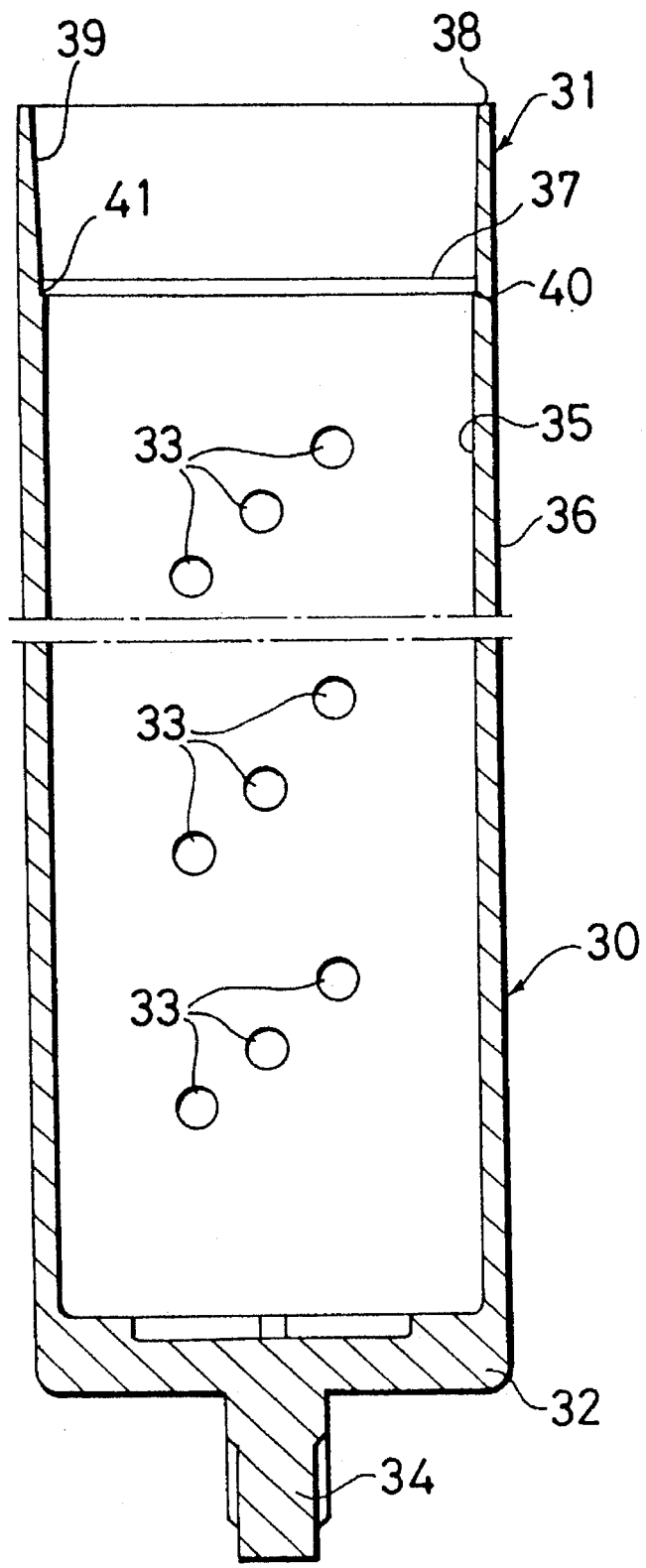
FIG. 6 is a sectional view showing a cylindrical member of FIG. 1.

This outer cylindrical member 30, as shown in FIG. 6, has an opening 31 at one end and has a plurality of gas outlets 33 formed in the outer periphery.

And, at the end 32 of the outer cylindrical member 30, an attachment 34 is integrally formed to be attached to an automobile.

Figure 7:
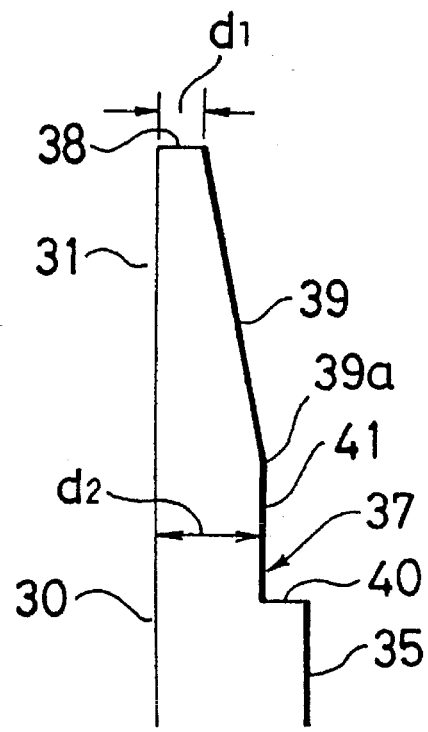
FIG. 7 is an enlarged cross section of the opening of the cylindrical member of FIG. 6.

The opening 31 of the outer cylindrical member 30, as shown in FIG. 6 and FIG. 7, has an end cap placing step section 37 with an approximately L-shaped cross section formed from an inner wall face 35 of the outer cylindrical member 30 toward an outer wall face 36 of the outer cylindrical member 30, and a taper section 39 having a diameter increased toward the opening end 38 ranging to the end cap placing step section 37.

And, an angle of the taper section 39, as shown in FIG. 7, is set so that the ratio d1/d2 of wall thickness d1 of the opening end 38 and wall thickness d2 of the end cap placing step section 37 falls in a range of 60 to 80%.

Figure 8:
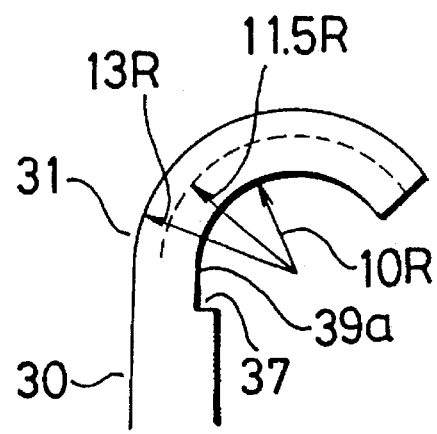
FIG. 8 is an explanatory view showing the caulked state of the opening of the cylindrical member of FIG. 3.

This is one condition to be described afterward so that a uniform wall thickness is obtained when the taper section 39 is caulked in that the inside is 10R, the middle is 11.5R and the outside is 13R as shown in FIG. 8.

A depth 40 of the end cap placing step section 37 is desired to be about 0.5 mm when wall thickness of the outer cylindrical member 30 is 3.5 mm.

And, a straight part 41 of the end cap placing step section 37 is desired to be about 2 mm when wall thickness of the outer cylindrical member 30 is 3.5 mm.

Figure 9:
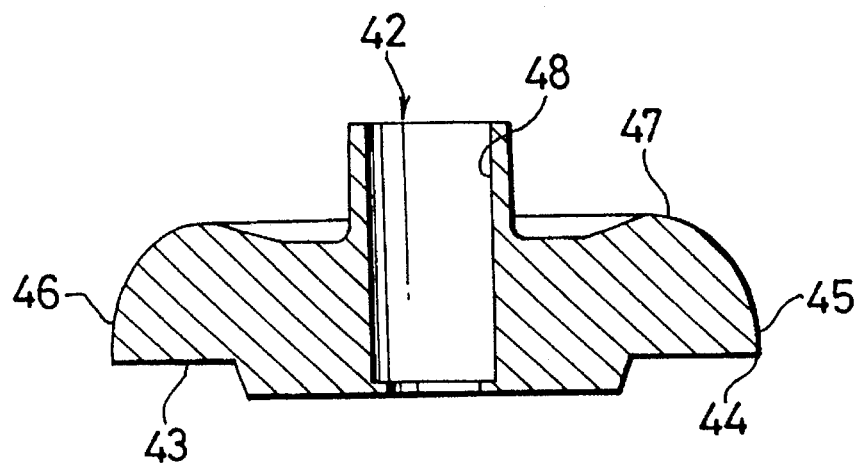
FIG. 9 is a sectional view showing an end cap of FIG. 3.
Figure 10:
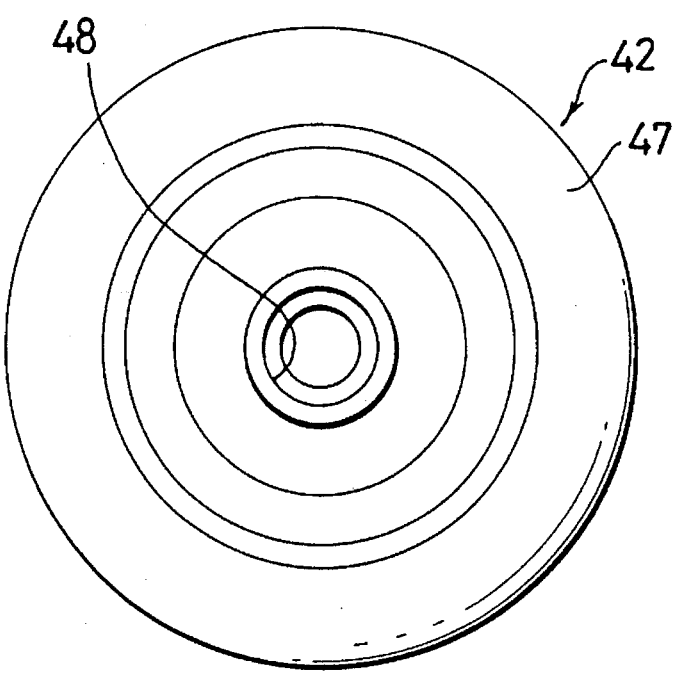
FIG. 10 is a plan view of the end cap of FIG. 9.
Figure 11:
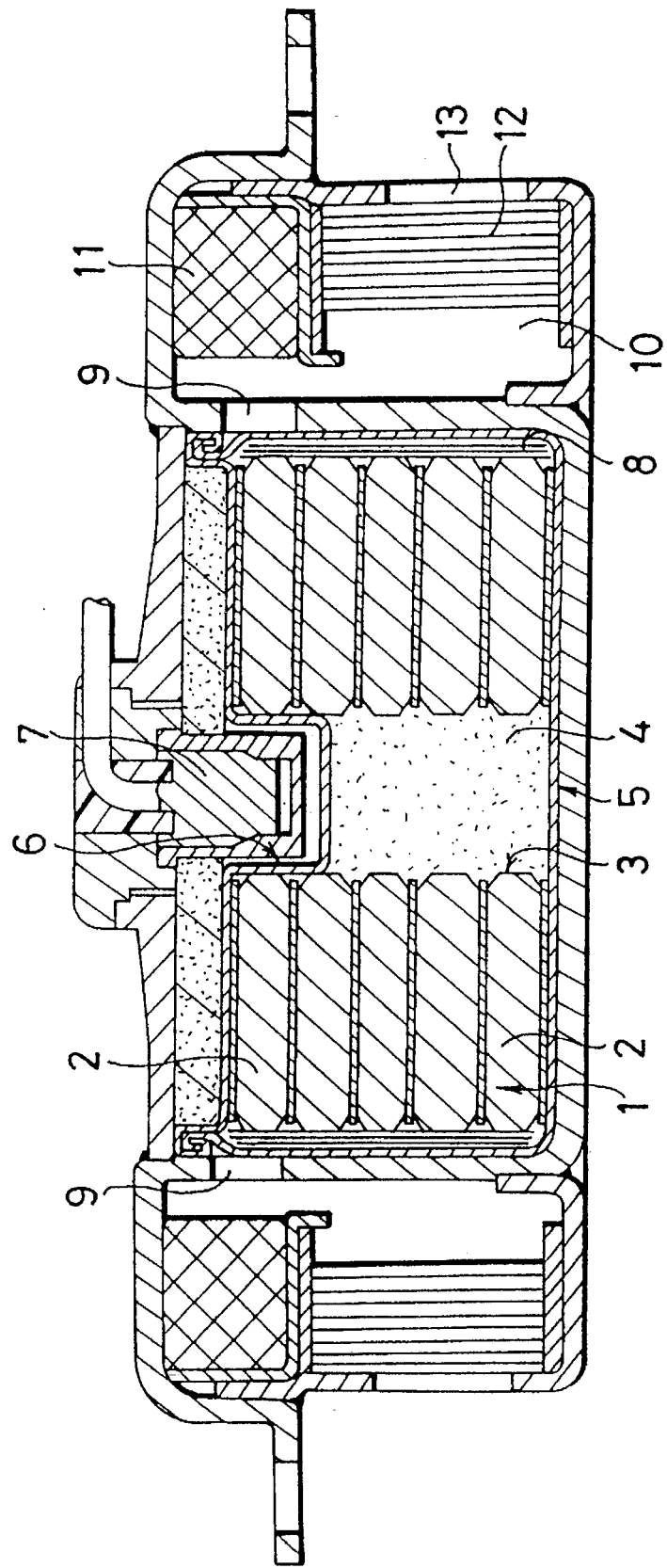
FIG. 11 is a vertical section of a conventional air bag inflation gas generator.
Figure 12:
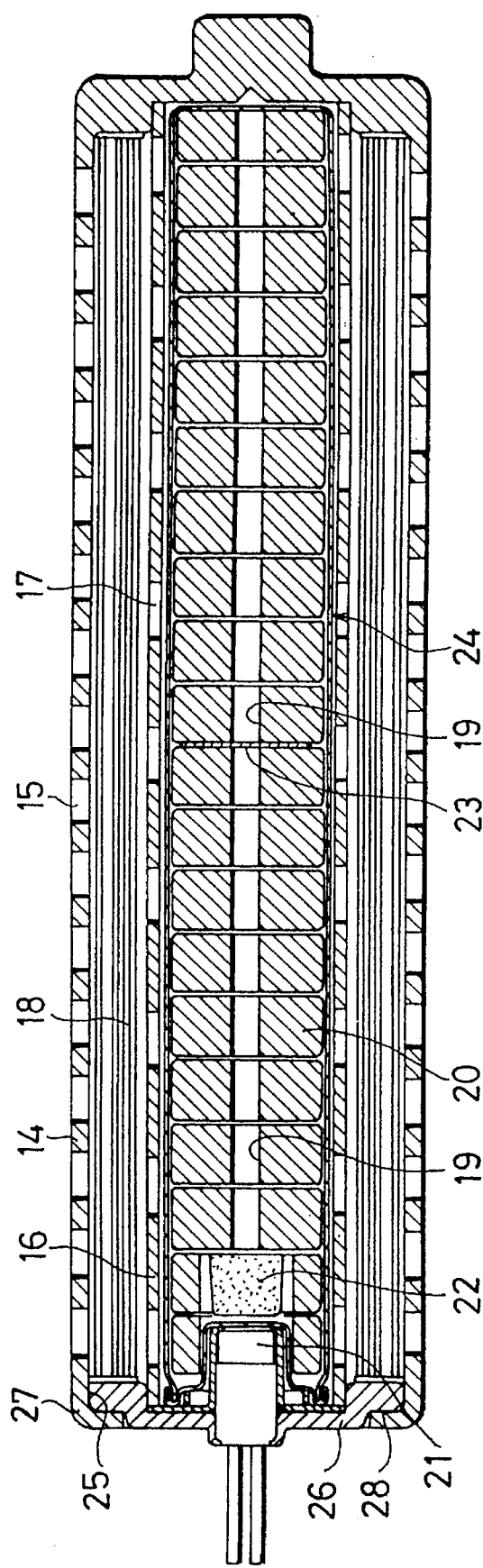
FIG. 12 is a vertical section of the air bag inflation gas generator according to Japanese Patent Application No. 299116/1991 filed by the present applicant.

The end cap 42, as shown in FIG. 9 and FIG. 10, has a wall face 45 tapering upwardly from a rim 44 of a inner face 43 and a caulking face 47 circularly formed with approximately R10 from a periphery 46 of the wall face 45 toward the center.

At the center of the end cap 42, a through hole 48 is formed, and an igniter 49 is fitted in the through hole 48 as shown in FIG. 1.

Within the outer cylindrical member 30, a cylindrical final filter 50 is disposed as shown in FIG. 1.

The final filter 50 is structured by, for example, winding gauze wire or woven metal wire one over another and has the function that the combustion gas is cooled so that the air bag is not damaged, the combustion residue contained in the combustion gas is removed, and harmless nitrogen gas only is supplied into the air bag.

Inside the final filter 50 is inserted an inner cylindrical member 52.

The outer periphery of the inner cylindrical member 52 is formed with lots of gas flow openings 53 entirely.

The inner cylindrical member 52 accommodates a gas generating agent pack 54.

Figure 3:
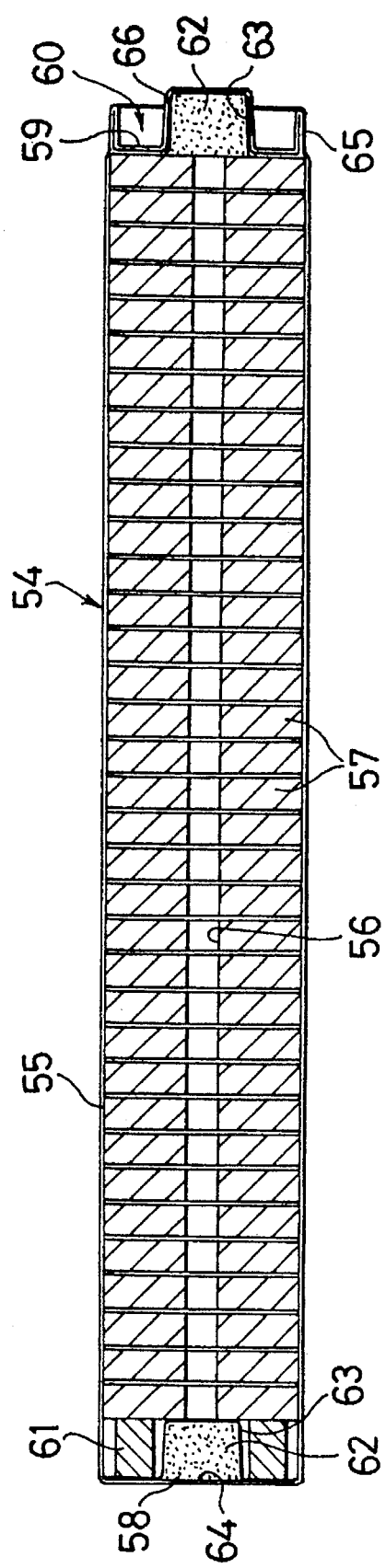
FIG. 3 is a sectional view of a gas generating agent pack of FIG. 1.

This gas generating agent pack 54 has a bottom-closed longitudinal cylindrical pack 55 made of aluminum as shown in FIG. 3.

Within the cylindrical pack 55, many gas generating agents 57 having a through hole 56 formed in their center are accommodated in the stacked state in the axial direction.

One end of the cylindrical pack 55 is sealed by one end face 58, and other end is sealed by another end face 60 made of, for example, an aluminum cap 57.

At one end of the cylindrical pack 55, a circular cushion material 61 is disposed.

This cushion material 61 is formed of, for example, expanded silicone rubber, which acts as an energizing means to energize the gas generating agents 57 toward the cap 59 side with its elasticity.

And, an ignition agent 62 is disposed at the center of the cushion material 61.

The ignition agent 62 is accommodated in an ignition agent pack 63, and a end 64 of the ignition agent pack 63 is contacted to the one end face 58 of the cylindrical pack 55.

On the other hand, the cap 59 disposed on the other side of the cylindrical pack 55 is formed by tightly winding around the outer periphery by the cylindrical pack 55 to form a cylindrical fasten-folded section 65 commonly referred to as a double crimp seal.

And, at the center of the cap 59 is formed a projection 66 to accommodate an ignition agent 62.

The ignition agent 62 is accommodated in the ignition agent pack 63.

A packing 68 made of, for example, inflammable silicone rubber, is disposed between the end cap 42 and one end of the final filter 50 and between the bottom 32 and the other end of the final filter 50.

In this embodiment, an energizing member 69 is disposed between the cap 59 forming the other end face 60 of the gas generating agent pack 54 and the bottom 32 of the outer cylindrical member 30.

This energizing member 69 is cylindrical and disposed between the fasten-folded section 65 and the projection 66.

And, the energizing member 69 is formed of, for example, expanded silicone rubber, which acts as an energizing means to energize the gas generating agent pack 54 toward the igniter 49 side with its elasticity.

Figure 4:
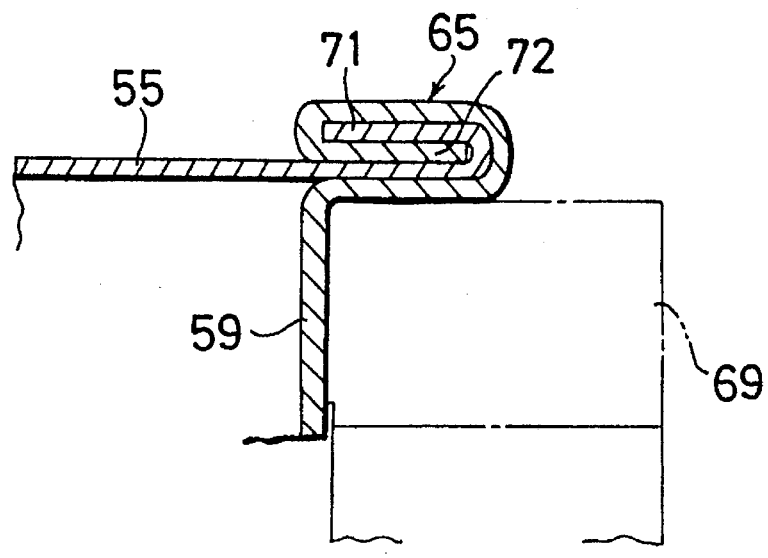
FIG. 4 is a sectional view showing details of a fasten-folded section of the gas generating agent pack of FIG. 1.

On the other hand, the cap 59 forming the other end face 60 of the cylindrical pack 55 and the opening end of the cylindrical pack 55 are fasten-folded double as shown in FIG. 4.

Specifically, the opening end of the cylindrical pack 55 is outwardly turned down to form a turned part 71.

The cap 59 is outwardly bent along the internal circumference of the cylindrical pack 55 and bent again along the outside of the turned part 71 of the cylindrical pack 55, and a leading end 72 is inserted between the turned part 71 and the cylindrical pack 55.

In the above air bag inflation gas generator, within the outer cylindrical member 30 shown in FIG. 6, the gas generating agent pack 55 and the final filter 50 are mounted in the same way as shown in FIG. 1, then the end cap 42 is mounted on the end cap placing step section 37 within the opening 31 of the outer cylindrical member 30.

Then, as shown in FIG. 7 and FIG. 8, with a press caulking or roll caulking not shown, the taper section 39 of the opening 31 is caulked toward the caulking face 47 of the end cap 42.

At this time, the taper section 39 is turned from a boundary 39a of the straight part 41 toward the caulking face 47.

Specifically, the boundary 39a is an R starting point, and the taper section 39 is turned while avoiding the concentration of a stress by the straight part 41.

And, it was confirmed that when the outer cylindrical member 30 has a wall thickness of 3.5 mm, the end cap placing step section 37 has a wall thickness of 3 mm and the opening end 38 of the taper section 39 has a wall thickness of 2 mm, the opening 31 has concentricity of the inside of 10R, the middle of 11.5R and the outside of 13R as shown in FIG. 8.

Specifically, it was found that the wall at the base of the taper section is increased toward the leading end and the wall thickness over the entire caulking section to be turned becomes uniform.

The caulking conditions include known press caulking and roll caulking.

In case of the press caulking, for example, a mold is attached to a hydraulic press to caulk. And in case of the roll caulking, chucking is conducted with equipment such as a lathe to caulk.

In this embodiment, the outer cylindrical member 30 is made of JIS 5052 series aluminum material.

After forging into the shape as shown in FIG. 7, the outer cylindrical member 30 is subjected to a stabilizing treatment for heating at 180° to 280° C. for 1 to 4 hours to improve caulking property.

As a result of this stabilizing treatment, elongation was improved by 13% or more and tensile strength by 25 Kg/mm and hardness lowered to 100 HV (Hi-Vickers hardness) or below.

According to the experiment by the inventor, as a result of studying various materials to find an optimum material, Mg was found to be suitable when added to the material at 5% by weight or below.

Mg is a factor giving adverse effects on elongation. tensile strength and hardness.

In view of this, among JIS 5000 series aluminum materials, those of 5056 series and 256S series are preferable. And, those with Mg content adjusted may be used.

But, with 6061 series which are JIS 6000 series aluminum materials, conditions such as elongation of 13% or more, tensile strength of 25 Kg/mm² or more and hardness of 100 HV or below can not be satisfied, and it was confirmed that cracks are caused when caulking.

And, radius of the caulking face of the end cap was determined to be 10R, which is obtained as follows.

Since the outer cylindrical member 30 is made of JIS 5052 series aluminum material, its elongation can be determined as 13%.

And, caulking R is obtained by the formula: Wall thickness (1-Elongation)/2×Elongation where, wall thickness is of the end cap placing step section 37 of the outer cylindrical member 30.

Therefore, caulking R is obtained as 3(1−0.13)/2×0.13= 10 as shown in FIG. 8.

When the taper section 39 is not provided, wall thickness of the caulking section varies, and the end cap 42 cannot be securely held for a long time.

And, when the end cap placing step section 37 is not provided, buckling may be caused due to the concentration of a stress because the straight part 41 is not provided.

Therefore, the straight part 41 is desired to have a length of 0.5 mm or more.

A depth 40 of the end cap placing step section 37 is preferably about 0.5 mm so that the end cap can be surely received when caulking.

Further, the curvature of the caulking face 47 of the end cap 42 has been described as 10R but the inventor's experiments indicate that it is preferably 4R to 12R although it varies depending on the materials used.

When it is less than 4R, wrinkles may be formed when caulking, and when it exceeds 12R, the straight part 41 of the end cap placing step section 37 is short and a stress tends to concentrate on the R starting point and there is fear of buckling taking place.

In the aforementioned air bag inflation gas generator, when electricity is passed to the igniter 49, the ignition agent 62 burns in turn burning the gas generating agents 57. And, the cylindrical pack 55 of the gas generating agent pack 54 breaks at the position of the gas flow openings 53 of the inner cylindrical member 52. Combustion gas passes through the gas flow openings 53 of the inner cylindrical member 52 to flow into the final filter 50 to be purified and flows into the air bag from the gas outlets 33 of the outer cylindrical member 30.

And, in this embodiment, when electricity is passed to the igniter 49 disposed at one end of the outer cylindrical member 30, the ignition agent 62 at one end burns and the gas generating agents 57 on the igniter 49 side start to burn and, at the same time, the ignition agent 62 at the other end burns and the gas generating agents 57 on the side of the ignition agent 62 at the other end burn.

And, in the air bag inflation gas generator structured as above, between the bottom 59 of the outer cylindrical member 30 and the other side end face 60 of the gas generating agent pack 54, the energizing member 69 which energizes the gas generating agent pack 54 toward the igniter 49 side is disposed, so that the space between the igniter 49 and the ignition agent 62 at one end of the gas generating agent pack 54 can be securely retained.

Specifically, in the air bag inflation gas generator of this embodiment, the leading end position of the igniter 49 against the end cap 42 is restricted by a step section 73 of the through hole 48 of the end cap 42, and one end face 58 of the gas generating agent pack 54 is always contacted to an end face 70 of the end cap 42 by the energizing force of the energizing member 69, so that the space between the igniter 49 and the ignition agent 62 at one end of the gas generating agent pack 54 can be securely retained.

As a result, the space between the igniter 49 and the ignition agent 62 can be retained at a certain distance, and possibility of lowering the ignition performance can be solved satisfactorily.

And, in the above air bag inflation gas generator, since the cap 59 and the opening end of the cylindrical pack 55 are fasten-folded double, possible opening of a fasten-folded section 65 of the cap 59 and the cylindrical pack 55 can be completely prevented.

Figure 5:
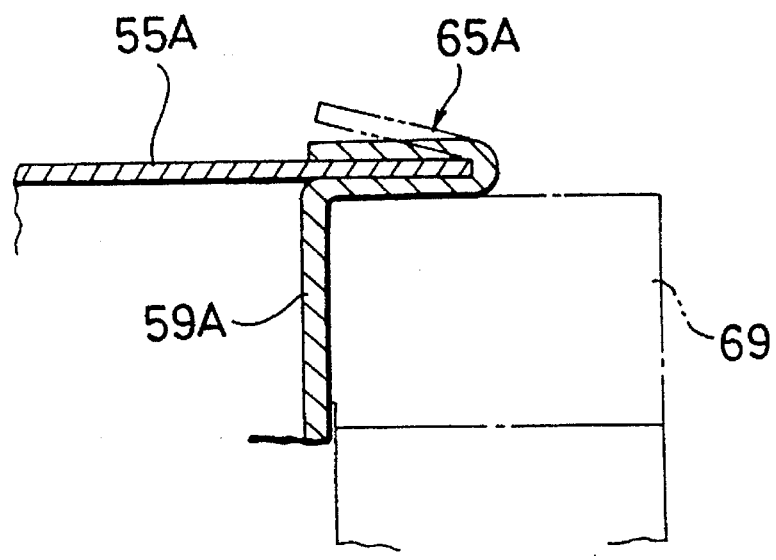
FIG. 5 is a sectional view showing details of a fasten-folded section of a conventional gas generating agent pack.

More specifically, when a cap 59A and an opening end of a cylindrical pack 55A are simply fasten-folded as shown in FIG. 5, the energizing force of the energizing member 69 pushes the cap 59A inward, and a fasten-folded section 65A of the cap 59A may be opened as indicated in a two dot and dash line in the drawing. On the other hand, in the air bag inflation gas generator of this embodiment, even when the cap 59 is pushed inward by the energizing force of the energizing member 69, the fasten-folded section 65 is precluded the possibility of opening. As a result, the energizing member 69 can securely press the gas generating agent pack 54 against the igniter 49 side, and the gas generating agent pack 54 can be completely sealed.

In the above embodiment, the energizing member 68 is made of expanded silicone rubber, but this invention is not limited to that embodiment. For example, it is needless to mention that the energizing member 68 may be made of, for example, a coil spring, leaf spring or air cushion.

And, in the above embodiment, the cushion material 61 is disposed on the side of one end face 58 of the cylindrical pack 55, but this invention is not limited to that embodiment. For example, the cushion material 61 may be disposed on the side of the other end face 60, and also can be disposed on either side of the one end face 58 and the other end face 60.

As described above, the opening 31 of the outer cylindrical member 30 has the end cap placing step section 37 with an approximately L-shaped cross section formed from the inner wall face 35 of the outer cylindrical member 30 toward the outer wall face 36 of the outer cylindrical member 30, and the taper section 39 having a diameter increased toward the opening end 38 ranging to the end cap placing step section 37. And, the end cap 42 has the wall face 45 vertically rising from the rim 44 of the bottom face 43 and the caulking face 47 circularly formed from a periphery of the wall face 45 toward the center. Therefore, when the opening 31 is caulked after the end cap 42 is placed on the end cap placing step section 37 of the opening 31, the taper section 39 starts to bend from the boundary 39a of the straight section 37 of the end cap placing step section 37 and bends along the caulking face 47 of the end cap 42 while flowing the material toward the opening end 38.

Thus, the taper section 39 can caulk at the curvature corresponding to that of the caulking face 42 of the end cap 42 with the curvatures of the inside and outside substantially agreed without causing cracks as shown in FIG. 8.

What is claimed is:
1. An air bag inflation gas generator comprising:
   a longitudinal outer cylindrical member having a first closed end and a second end having an opening and a plurality of gas outlets formed in the outer periphery,
   a circular end cap disposed in the opening of the outer cylindrical member and caulked by a wall face of said opening, a gas generating agent pack comprising a longitudinal cylindrical pack, wherein said gas generating agent pack is accommodated in said outer cylindrical member, and an igniter disposed in said end cap, said opening of the outer cylindrical member having an end cap placing step section having an approximately L-shaped cross section formed toward an outer wall face of the outer cylindrical member from an inner wall face of said cylindrical member and a taper section having a diameter increased toward the opening end ranging to the end cap placing step section, and said end cap having a wall face tapering inwardly from a rim of an inner face and a caulking face circularly formed from the periphery of the wall face toward the center whereby said taper section is caulked to cover said caulking face.

2. An air bag inflation gas generator according to claim 1, wherein said cylindrical member is made of aluminum.

3. An air bag inflation gas generator according to claim 1, where said cylindrical pack is made of aluminum.

* * * * *